United States Patent
Nakashima et al.

(10) Patent No.: US 8,755,287 B2
(45) Date of Patent: Jun. 17, 2014

(54) NETWORK MANAGING DEVICE AND NETWORK MANAGING METHOD

(75) Inventors: Kohta Nakashima, Kawasaki (JP); Akira Naruse, Machida (JP)

(73) Assignee: Fujitsu Limited, Kawasaki (JP)

(*) Notice: Subject to any disclaimer, the term of this patent is extended or adjusted under 35 U.S.C. 154(b) by 131 days.

(21) Appl. No.: 13/451,618

(22) Filed: Apr. 20, 2012

(65) Prior Publication Data

US 2013/0021922 A1 Jan. 24, 2013

(30) Foreign Application Priority Data

Jul. 19, 2011 (JP) ................................. 2011-158479

(51) Int. Cl.
| | | |
|---|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |

(52) U.S. Cl.
USPC ........... 370/244; 370/250; 370/252; 370/254; 370/255; 370/256

(58) Field of Classification Search
CPC ....... H04L 45/48; H04L 49/25; H04L 49/351; H04L 49/356–49/358; H04L 52/02; H04L 45/28; H04L 41/12; H04L 45/02
USPC .......................... 370/244, 250, 252, 254–256; 709/220–222
See application file for complete search history.

(56) References Cited

U.S. PATENT DOCUMENTS

| | | | |
|---|---|---|---|
| 6,694,361 B1 | 2/2004 | Shah et al. | |
| 7,016,299 B2 | 3/2006 | Kashyap | |
| 7,321,561 B2 | 1/2008 | Lackshminarasimha | |
| 7,698,408 B1 | 4/2010 | Johnsen et al. | |
| 2003/0021223 A1* | 1/2003 | Kashyap | 370/217 |
| 2009/0041049 A1* | 2/2009 | Scott et al. | 370/419 |
| 2009/0327316 A1* | 12/2009 | Sahni et al. | 707/100 |
| 2012/0151026 A1* | 6/2012 | Chen et al. | 709/223 |

OTHER PUBLICATIONS

Extended European Search Report dated Nov. 15, 2012 for corresponding European Application No. 12165133.5.
M. Valerio et al., "Using Fat-Trees to Maximize the Number of Processors in a Massively Parallel Computer," Department of Electrical and Computer Engineering, University of California, Santa Barbara, 1993, pp. 128-134.

* cited by examiner

Primary Examiner — Awet Haile
Assistant Examiner — Eric Myers
(74) Attorney, Agent, or Firm — Fujitsu Patent Center

(57) ABSTRACT

An initial address allocating unit 11 allocates a predetermined address to each of the nodes 21 connected to respective first stage switches 22. A connecting state acquiring unit 12 acquires a connecting state from each of the first stage switches 22, each of second stage switches 23 and each of third stage switches 24. An erroneous connection detecting unit 13 compares the connecting state acquired by the connecting state acquiring unit 12 with a prestored predetermined connecting state, thereby detecting an erroneous connection. An address changing unit 14 changes an address of the node 21 allocated by the initial address allocating unit 11 to satisfy a first predetermined condition based on the connecting state, when the erroneous connection is detected by the erroneous connection detecting unit 13.

3 Claims, 11 Drawing Sheets

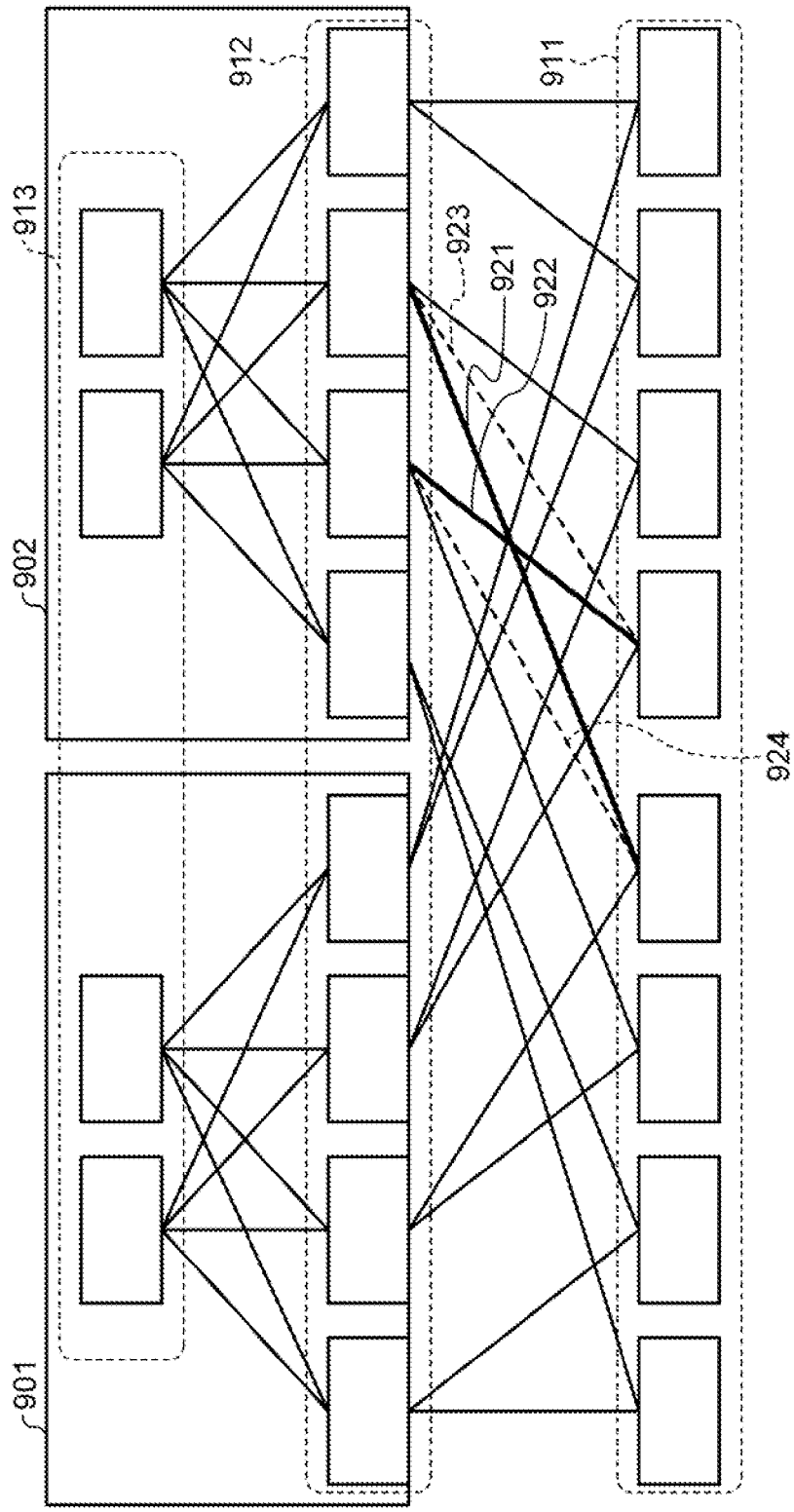

NETWORK MANAGING DEVICE AND NETWORK MANAGING METHOD

CROSS-REFERENCE TO RELATED APPLICATION(S)

This application is based upon and claims the benefit of priority of the prior Japanese Patent Application No. 2011-158479, filed on Jul. 19, 2011, the entire contents of which are incorporated herein by reference.

FIELD

The embodiment discussed herein is directed to a network managing device and a network managing method.

BACKGROUND

In recent years, a cluster system for connecting a large number of nodes, for example, servers or the like through a high speed network is widely used in the HPC (High Performance Computer) field. In such a cluster system, a parallel computation processing is often carried out. For a communication in the parallel computation processing, it is demanded to ensure wide bandwidth and to obtain low latency in a signal transmission. In order to implement them, particularly, there is widely used a Fat Tree connection through InfiniBand in a large scale cluster system (see, for example, Using Fat-Trees to Maximize the Number of Processors in a Massively Parallel Computer, M. Valerio, L. E. Moser and P. M. Melliar-Smith, Department of Electrical and Computer Engineering University of California, Santa Barbara).

In the InfiniBand, there is a crossbar switch having a maximum 36-port structure. In the case in which a switch having a larger scale is used, there are used multiport switches 901 and 902 including a network having a plurality of switches connected through Fat Tree in two stages as illustrated in FIG. 11, and the like. FIG. 11 is a diagram illustrating a structure of a network device having a configuration of Fat Tree using a multiport switch.

The Fat Tree represents a topology of a network having a tree type network configuration which is multiplexed, for example, the structure illustrated in FIG. 11. In FIG. 11, the network has the multiport switches 901 and 902 and a switch in a lower stage which constitute two-stage Fat Tree. However, the multiport switches 901 and 902 further include the configuration of the Fat Tree. Therefore, there are logically three stages. In FIG. 11, a switch included in a region surrounded by a dotted line 911 is set to be a first stage switch, a switch included in a region surrounded by a dotted line 912 is set to be a second stage switch, and a switch included in a region surrounded by a dotted line 913 is set to be a third stage switch.

In the connection of the Fat Tree illustrated in FIG. 11, the connection of the second stage switch and the third stage switch is mounted in a housing of the multiport switch, and there is no fear of an erroneous connection.

On the other hand, the connection between the first stage switch and the second stage switch is singly carried out through a manual operation by a network manager. For this reason, there is a fear that an erroneous connection might be caused in a connection between the first stage switch and the second stage switch. In particular, a large number of cables are intensively provided on the multiport switch 901 and 902 sides. Therefore, there is a high possibility that the erroneous connection might be caused. For this reason, conventionally, the connection is checked after a connecting work is completed, and the connection is corrected and a new connection is thus constructed if the erroneous connection is detected. When a large scale InfiniBand network is to be constructed, particularly, the work for detecting and correcting the erroneous connection requires a large number of man-hours. Consequently, an efficiency of the network constructing work is reduced so that a time required for the work is prolonged.

As the erroneous connection, for example, a connection is carried out in a state in which paths are erroneously replaced with each other like paths 923 and 924 illustrated in the dotted line of FIG. 11 though paths 921 and 922 are to be originally obtained. In the case of the erroneous connection, when standard routing in the Fat Tree is carried out, a path competition is caused, that is, at least two signals are transmitted to a single path at the same time in a collective communication represented by an all-to-all communication. Consequently, a band through which the signal passes in the signal transmission is reduced. For this reason, even if a network is constructed to have the configuration of the Fat Tree in the case of the erroneous connection, there is a fear that a performance such as a signal transmitting speed might be deteriorated.

SUMMARY

According to an aspect of an embodiment of the invention, a network managing device for managing a network in which a plurality of first stage switches having a plurality of nodes connected thereto respectively, a plurality of second stage switches to be upper switches in the first stage switches and a plurality of third stage switches to be upper switches of the second stage switches are connected in a configuration of Fat Tree, the network managing device includes: an initial address allocating unit that allocates an address to the nodes connected to the respective first stage switches; a connecting state acquiring unit that acquires each of connecting states from the first stage switch, the second stage switch and the third stage switch; an erroneous connection detecting unit that compares the connecting state acquired by the connecting state acquiring unit with a prestored connecting state, thereby detecting an erroneous connection; and an address changing unit that changes the address of the node which is allocated by the initial address allocating unit to satisfy a first condition based on the connecting state, when the erroneous connection is detected by the erroneous connection detecting unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 3 is a diagram for explaining connection information acquired by a switch;

FIG. 11 is a diagram illustrating a structure of a network device having a Fat Tree configuration using a multiport switch.

DESCRIPTION OF EMBODIMENT

Preferred embodiments of the present invention will be explained with reference to accompanying drawings.

The network managing device and the network managing method which are disclosed in the present invention are not restricted to the following embodiment. Although the description will be given by taking, as an example, a 3-stage Fat Tree configuration using a 6-port switch, particularly, the present invention is not restricted thereto but it is also possible to use other switches, for example, a 4-port switch, an 8-port switch and the like.

Figure 1:
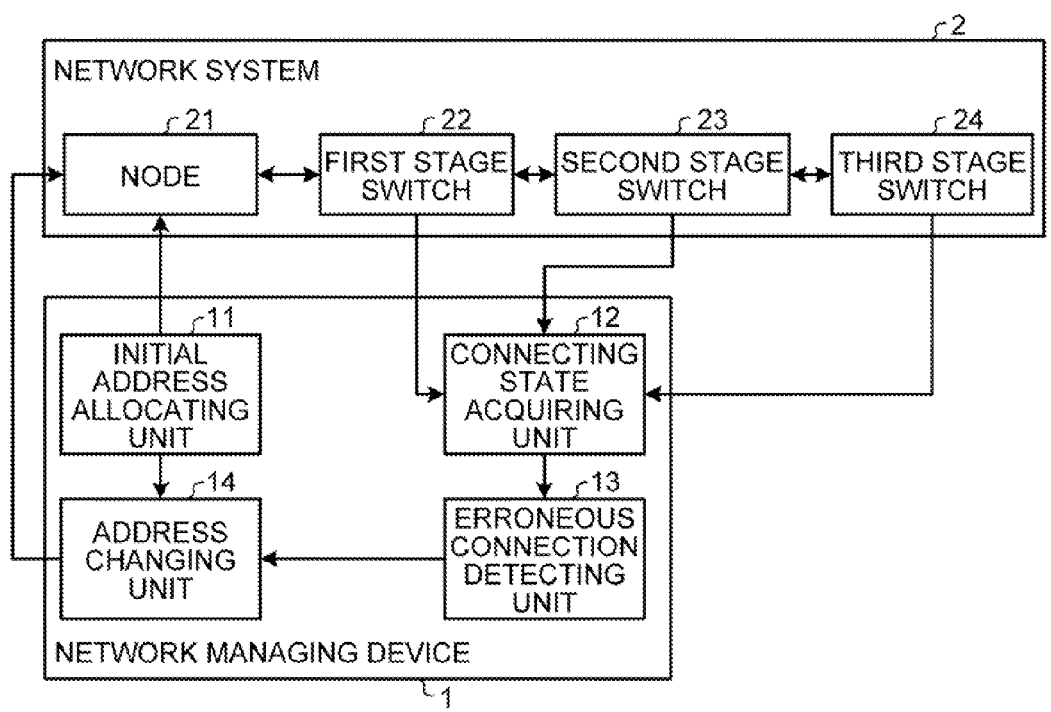
FIG. 1 is a block diagram illustrating a network managing device according to an embodiment.

FIG. 1 is a block diagram illustrating a network managing device according to an embodiment. As illustrated in FIG. 1, a network managing device 1 according to the present embodiment has an initial address allocating unit 11, a connecting state acquiring unit 12, an erroneous connection detecting unit 13 and an address changing unit 14. Furthermore, the network managing device 1 is connected to a network system 2 to be a managing target.

Moreover, the network system 2 has a node 21, a first stage switch 22, a second stage switch 23 and a third stage switch 24. The node 21, the first stage switch 22, the second stage switch 23 and the third stage switch 24 are connected to have a Fat Tree configuration through a network, respectively.

Figure 2:
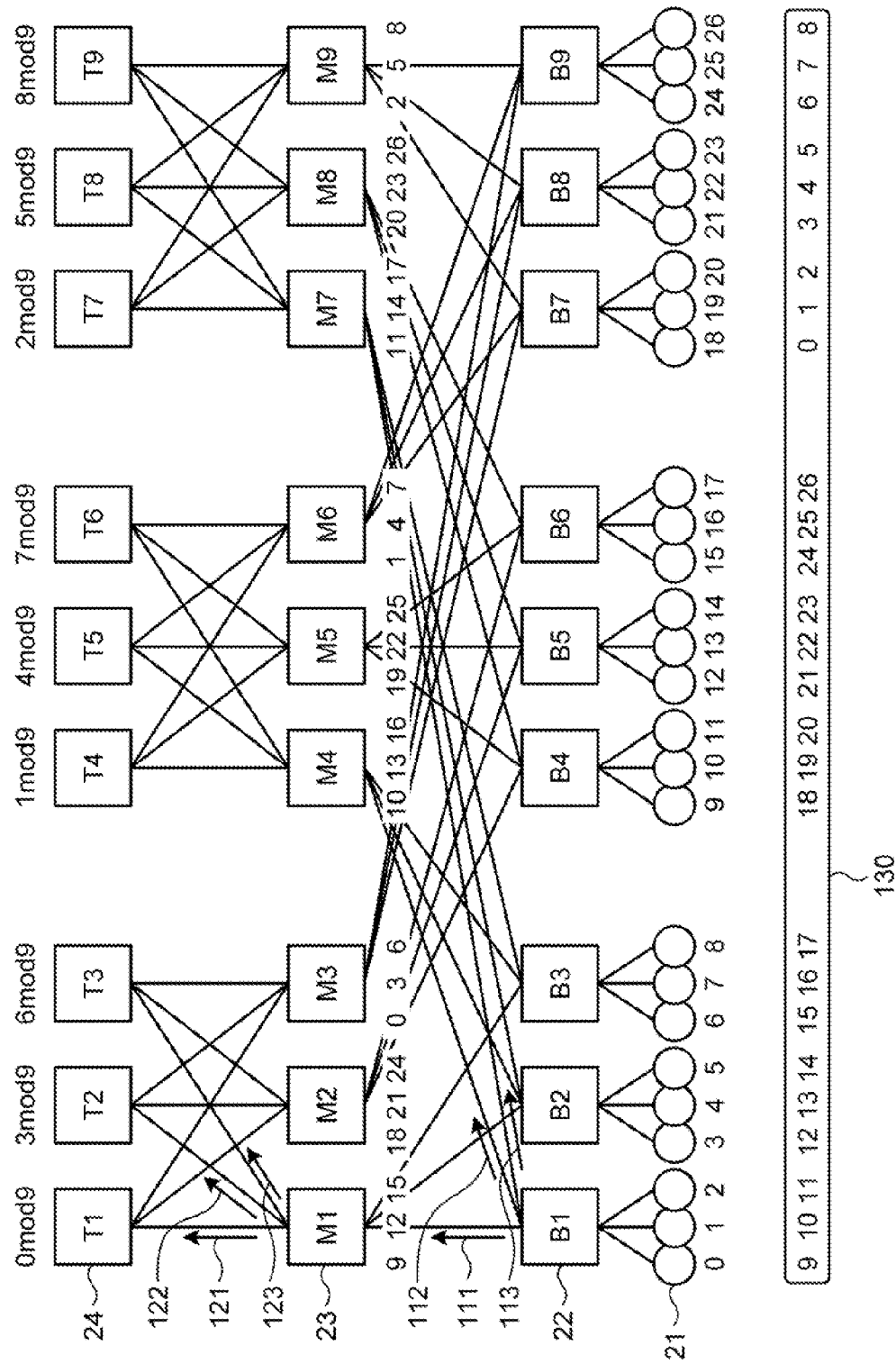
FIG. 2 is a diagram illustrating a normal connecting state of a Fat Tree configuration of a network according to the embodiment.

A structure of the network system 2 will be described with reference to FIG. 2. FIG. 2 is a diagram illustrating a normal connecting state having the Fat Tree configuration of the network according to the embodiment. As illustrated in FIG. 2, the first stage switch 22 has nine switches B1 to B9 in the present embodiment. Moreover, the second stage switch 23 has nine switches M1 to M9 in the present embodiment. Furthermore, the third stage switch 24 has nine switches T1 to T9 in the present embodiment. The first stage switch 22 and the second stage switch 23 are 8-port switches. Moreover, the third stage switch 24 is a 4-port switch. In the following, individual switches included in the first stage switches 22 will be described by using the switches B1 to B9. In addition, individual switches included in the second stage switches 23 will be described by using the switches M1 to M9. Furthermore, individual switches included in the third stage switches 24 will be described by using the switches T1 to T9. Moreover, B1 to B9, M1 to M9 and T1 to T9 will be hereinafter referred to as respective switch numbers. The switch number is represented depending on a numeric value attached after an alphabet. For example, the switch B1 has a smaller number than the switch B2.

Three nodes are connected to the first stage switch 22, respectively. The node represents a server or the like, for example. Moreover, the first stage switch 22 is connected to three second stage switches 23 to have the Fat Tree configuration, respectively. For example, the switches B1 to B3 are connected to the switches M1, M4 and M7, respectively. Moreover, the switches B4 to B6 are connected to the switches M2, M5 and M8, respectively. Furthermore, the switches B7 to B9 are connected to the switches M3, M6 and M9, respectively.

Moreover, the second stage switch 23 is connected to three third stages switches 24 to have the Fat Tree configuration, respectively. For example, the switches M1 to M3 are connected to the switches T1 to T3, respectively. Furthermore, the switches M4 to M6 are connected to the switches T4 to T6, respectively. In addition, the switches M7 to M9 are connected to the switches T6 to T9, respectively. The connecting state illustrated in FIG. 2 will be hereinafter referred to as a "normal connecting state".

An address is allocated to each node 21 depending on a serial number as will be described below. In some cases, the address allocated to each node 21 will be hereinafter referred to as a node number. When a signal is to be transmitted, each node 21 specifies an address of a node of a transmitting destination, that is, a node number and transmits the signal.

The first stage switch 22 receives a signal transmitted to another node by the node 21. In the case in which a remainder obtained by dividing the node number of the transmitting destination for the received signal by three is zero (0 mod 3), the first stage switch 22 transmits a signal to any of the second stage switches 23 which is connected to itself and has the smallest number. In the case in which the remainder obtained by dividing the node number of the transmitting destination for the received signal by three is one (1 mod 3), the first stage switch 22 transmits a signal to any of the second stage switches 23 which is connected to itself and has the second smallest number. In the case in which the remainder obtained by dividing the node number of the transmitting destination for the received signal by three is two (2 mod 3), moreover, the first stage switch 22 transmits a signal to any of the second stage switches 23 which is connected to itself and has the greatest number. For example, in the case in which the node number of the transmitting destination for the received signal is 0 mod 3, the switch B1 transmits a signal to the switch M1. In other words, if the node number of the transmitting destination for the signal received by the switch B1 is 0 mod 3, the signal is transmitted via a path 111. In the case in which the node number of the transmitting destination for the received signal is 1 mod 3, moreover, the switch B1 transmits a signal to the switch M4. In other words, the node number of the transmitting destination for the signal received by the switch B1, the signal is transmitted via a path 112. In the case in which the node number of the transmitting source for the received signal is 2 mod 3, furthermore, the switch B1 transmits a signal to the switch M7. In other words, in the case in which the node number of the transmitting destination for the signal received by the switch B1 is 2 mod 3, the signal is transmitted via a path 113.

The second stage switch 23 receives, from the first stage switch 22, a signal transmitted from any of the nodes to the other node. Then, the second stage switch 23 selects the third stage switch 24 to be a transmitting destination for the signal depending on a remainder obtained through a division of the received signal by nine. More specifically, each second stage switch 23 transmits a signal to be the same remainder as a mod function described on an upper side of the third stage switch 24 in FIG. 2 toward the paper to the third stage switch 24 where the mod function is described on the upper side.

For example, in the case in which the node number of the transmitting destination for the received signal is 0 mod 9, the switch M1 transmits a signal to the switch T1. In other words, if the node number of the transmitting destination for the signal received by the switch M1 is 0 mod 9, the signal is transmitted via a path 121. In the case in which the node number of the transmitting destination for the received signal is 1 mod 9, moreover, the switch M1 transmits a signal to the switch T2. In other words, if the node number of the transmitting destination for the signal received by the switch M1 is 1 mod 9, the signal is transmitted via a path 122. In the case in which the node number of the transmitting destination for the received signal is 2 mod 9, furthermore, the switch M1 transmits a signal to the switch T3. In other words, in the case in which the node number of the transmitting destination for the signal received by the switch M1 is 2 mod 9, the signal is transmitted via a path 123.

Furthermore, FIG. 3 is a diagram for explaining connection information acquired by a switch. Connection information 201 represents an example of connection information acquired by the switch M1. The switches B1 to B9, M2 to M9 and T1 to T3 can acquire connection information about a connection to a self port, for example, the connection information 201, respectively. For example, each switch acquires the connection information by the following method. Herein, description will be given by taking the switch M1 as an example. The switch M1 gives an inquiry for a connecting destination from each of the self ports upon receipt of an instruction from the network managing device 1. Then, the switch M1 receives the purport that the connecting destination is the port 4 of the switch B1 as a response to an inquiry output from the port 1. Moreover, the switch M1 receives the purport that the connecting destination is the port 5 of the switch B2 as a response to an inquiry output from the port 2. Furthermore, the switch M1 receives the purport that the connecting destination is the port 6 of the switch B3 as a response to an inquiry output from the port 3. In addition, the switch M1 receives the purport that the connecting destination is the port 1 of the switch T1 as a response to an inquiry output from the port 4. Moreover, the switch M1 receives the purport that the connecting destination is the port 2 of the switch T2 as a response to an inquiry output from the port 5. In addition, the switch M1 receives the purport that the connecting destination is the port 3 of the switch T3 as a response to an inquiry output from the port 6. By using the information thus received, the switch M1 creates the connection information 201. In the same manner, the switches B1 to B9, the switches M2 to M9 and the switches T1 to T3 can also acquire the connection information.

Returning to FIG. 1, next, each unit of the network managing device 1 will be described. Herein, an erroneous connection is generated when a disconnection is caused and the connection is carried out again. In the present embodiment, therefore, the following operation is carried out by setting, as a trigger, that a link is disconnected and the connection is carried out again. However, the trigger of the operation is not restricted thereto. For example, a cycle of the operation may be determined to cyclically perform the operation. In the present embodiment, each unit detects an insertion and a removal of the link and is operated when detecting the insertion and removal. However, a method for detecting the insertion and removal may be another method. For example, an insertion and removal detecting unit may be provided to operate each unit when detecting the insertion and removal. Description of the detection of the insertion and removal of the link will be omitted.

When the network system is started, the initial address allocating unit 11 allocates, to each node, a node number which is a serial address and is possessed serially by the nodes connected to the first stage switch, and furthermore, is reduced in descending order of the number of the first stage switch. In the present embodiment, the initial address allocating unit 11 allocates the numbers of 0 to 26 to each node 21. In more detail, the initial address allocating unit 11 allocates the numbers of 1 to 3 to the node 21 connected to the switch M1 and then allocates the numbers 4 to 6 to the node 21 connected to the switch M2. Subsequently, the initial address allocating unit 11 sequentially repeats the allocation of the number to allocate the number up to the node 21 connected to the switch M9 in order as illustrated in FIG. 2. In the case in which each of the nodes 21 will be described below, a corresponding node is represented by using the node number allocated to each node 21. For example, the node 21 to which a node number of zero is allocated is represented as a node #0. In other words, in a state in which the address is allocated by the initial address allocating unit 11, nodes #0 to #26 are maintained to be arranged in order with the first stage switches 22 arranged in order of the number as illustrated in FIG. 2.

Next, a transmission state of a signal in this condition will be described with reference to FIG. 2. The network system 2 carries out an all-to-all communication using a shift communication pattern. The shift communication pattern is constituted by N communication phases when the number of the nodes is represented by N. In an i-th communication phase, a message is transmitted to a preceding node number by i from a self node number. If each node number is set to be p (p=1, 2, ..., N), accordingly, ((i+p)modN) serves as a transmitting destination for the message of each node in the i-th communication phase.

In FIG. 2, a numeral described on a lower side toward the paper of the node 21 indicates a node number allocated to each node 21 through the initial address allocating unit 11. In FIG. 2, furthermore, a numeral surrounded by a frame 130 represents a node number of a transmitting destination in each node in a ninth communication phase of the shift communication pattern. The node number of the transmitting destination in each node in the ninth communication phase is obtained by adding nine to the node number of each node. In the shift communication pattern, a node number of a signal to be received by the first stage switch 22 from the following node is serial. Accordingly, the first stage switch 22 receives three signals in which the node numbers of the transmitting destinations are 1 mod 3, 2 mod 3 and 3(0)mod 3, respectively. For this reason, the first stage switches 22 transmit respective received signals to the second stage switches 23 which are different from each other. In this case, the node numbers of the transmitting destinations for the signals received by the switches M1 to M9 have numbers described under the respective switches M1 to M9.

The second stage switch 23 receives signals having equal remainders obtained through a division by three in the nine serial node numbers of the transmitting destinations respectively. The numbers having the equal remainders obtained through the division by three in the nine serial node numbers of the transmitting destinations indicate numbers having different remainders obtained through a division by nine. For example, the switch M1 receives signals having node numbers of the transmitting destinations of 9, 12 and 15. Therefore, the switch M1 transmits the signal having the node number of the transmitting destination of 9 to the switch T1, transmits the signal having the node number of the transmitting destination of 12 to the switch T2, and transmits the signal having the node number of the transmitting destination of 15 to the switch T3. Also in the switches M2 to M9, similarly, the respective received signals are transmitted to the third stage switches which are different from each other. In the ninth communication phase, thus, only one signal is transmitted to a single path. Therefore, a path competition of the signals is not caused. Although the ninth communication phase has been described, furthermore, the path competition of the signals is not caused also in the other communication phases. In the normal connecting state illustrated in FIG. 2, thus, the path competition of the signals is not caused in the case in which a communication is carried out by using the shift communication pattern.

Figure 4:
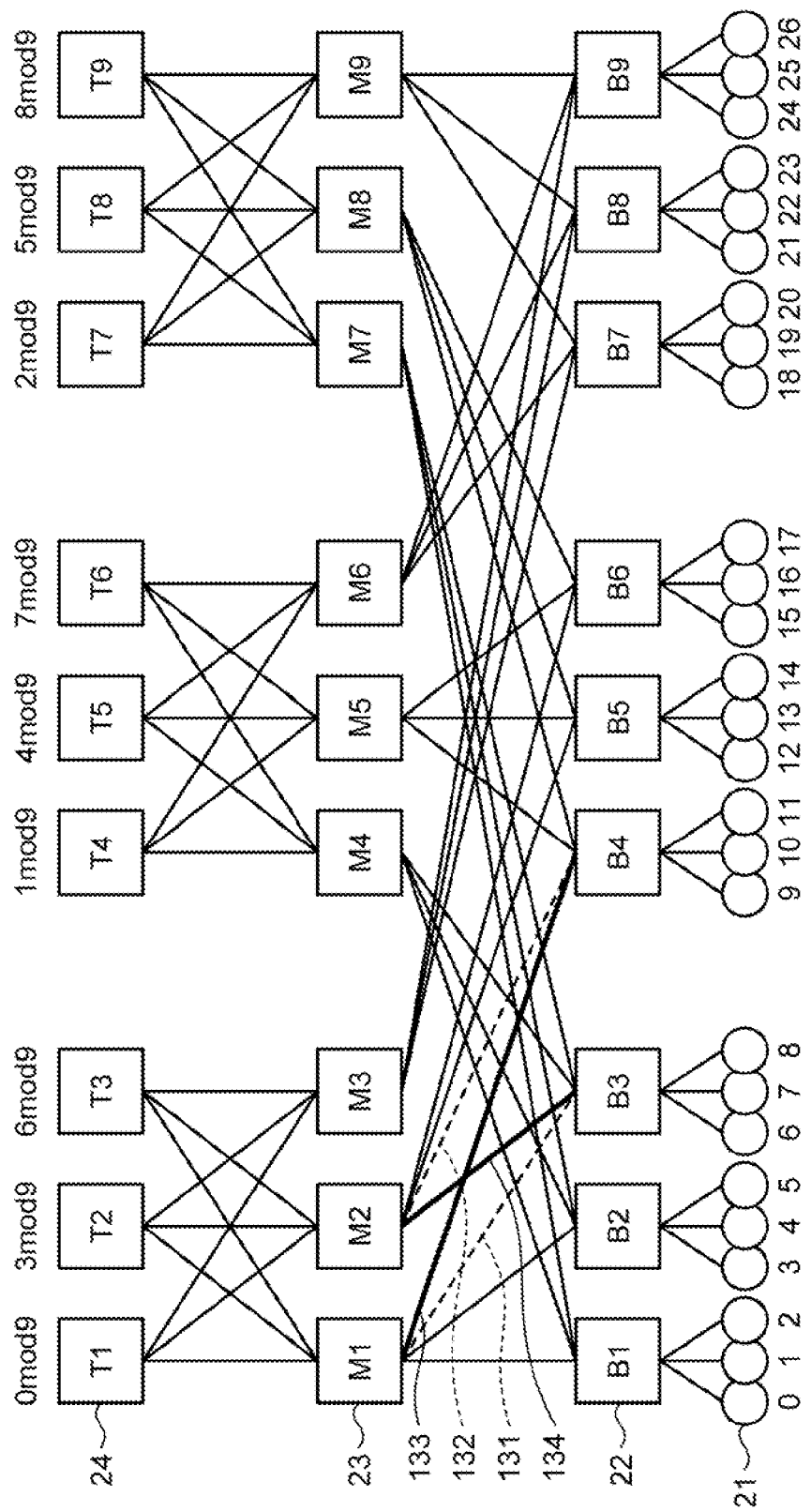
FIG. 4 is a diagram illustrating a state in which an erroneous connection of a network according to the embodiment is caused.

FIG. 4 is a diagram illustrating an example of a state in which an erroneous connection of a network is generated. In FIG. 4, a connection is carried out like paths 133 and 134 so that an erroneous connection is caused though the connection is to be carried out like paths 131 and 132 in the normal connecting state. In this case, the switches M1 and M2 receive different signals from those in the normal connecting state so that the path competition is caused. For example, in the state of FIG. 4, the switch M1 receives signals having the node numbers of the transmitting destination of 0 and 9. In this case, the node number is also 0 mod 9. Therefore, the switch M1 transmits two signals to the switch T1. Accordingly, the path competition is caused.

Returning to FIG. 1, the connecting state acquiring unit 12 acquires connection information from each of the first stage switch 22, the second stage switch 23 and the third stage switch 24. For example, the connecting state acquiring unit 12 transmits an information acquiring packet to be a notice instruction of the connecting state to a single switch connected by itself.

Figure 5:
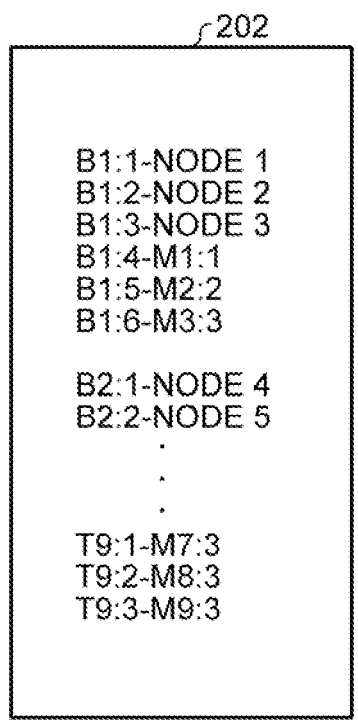
FIG. 5 is a diagram illustrating an example of a connection information table.

The switch receiving the packet gives the connecting state acquiring unit 12 its own identification information, a connected port number and its own active port information. The connecting state acquiring unit 12 records, in a connection information table, identification information about a connected switch and a port number. When acquiring the information about the active port, furthermore, the connecting state acquiring unit 12 transmits an information acquiring packet to a node connected to the active port of the switch or the switch. Then, the connecting state acquiring unit 12 acquires a response including each identification information, a port number receiving a packet and information about the active port from the switch connected to the active port. Thereafter, the connecting state acquiring unit 12 records the identification information of the switch receiving the response and the port number in the connection information table corresponding to a port of a switch to be a connecting source. Moreover, the connecting state acquiring unit 12 acquires a response including the identification information from the node connected to the active port. Then, the connecting state acquiring unit 12 records the identification information of the node receiving the response in the connection information table corresponding to the port of the switch to be the connecting source. The connecting state acquiring unit 12 repeats the acquirement of the connecting state. In other words, the connecting state acquiring unit 12 acquires connection information having the content of the connection information 201 illustrated in FIG. 3 from each switch and records the connection information in the connection information table. When acquiring the connection information described in the connection information table, the connecting state acquiring unit 12 does not transmit an information acquiring packet to a preceding switch or node. Thus, the connecting state acquiring unit 12 creates a connection information table 202 illustrated in FIG. 5. FIG. 5 is a diagram illustrating an example of the connection information table. The connecting state acquiring unit 12 outputs the acquired connection information table 202 to the erroneous connection detecting unit 13.

Moreover, the erroneous connection detecting unit 13 prestores connection information in the normal connecting state, that is, the state of FIG. 2. The erroneous connection detecting unit 13 acquires the connection information table 202 from the connecting state acquiring unit 12. Then, the erroneous connection detecting unit 13 compares the normal connecting state which is stored with a current connecting state acquired from the connecting state acquiring unit 12.

The erroneous connection detecting unit 13 decides that no erroneous connection is caused and ends a processing for changing an address if the normal connecting state is the same as the current connecting state. On the other hand, if the normal connecting state is different from the current connecting state, it is decided that the erroneous connection is caused. Then, the erroneous connection detecting unit 13 specifies the second stage switch 23 in which the current connecting state is different from the normal connecting state, that is, the erroneous connection is caused. Furthermore, the erroneous connection detecting unit 13 specifies the first stage switch 22 connected to the second stage switch 23 which is specified. Thereafter, the erroneous connection detecting unit 13 specifies another second stage switch 23 connected to the first stage switch 22 which is specified. In addition, the erroneous connection detecting unit 13 outputs information about the second stage switch 23 and the first stage switch 22 which are specified to the address changing unit 14 together with a connection relationship.

For example, in the case in which the erroneous connection illustrated in FIG. 4 is caused, the erroneous connection detecting unit 13 detects, from the connection information table, the fact that an erroneous connection of the switches M1 and M2 is caused. Then, the erroneous connection detecting unit 13 specifies the switches B1 to B6 as the first stage switch 22 connected to the switches M1 and M2. The switches B1 to B6 are an example of an "erroneous connection switch". Furthermore, the switches M4 and M5 are specified as other second stage switches connected to the switches B1 to B6. The switches M4 and M5 are an example of a "related switch". Thereafter, the erroneous connection detecting unit 13 outputs information about the switches M1, M2, M4, M5 and B1 to B6 and respective connection relationships to the address changing unit 14.

Figure 6:
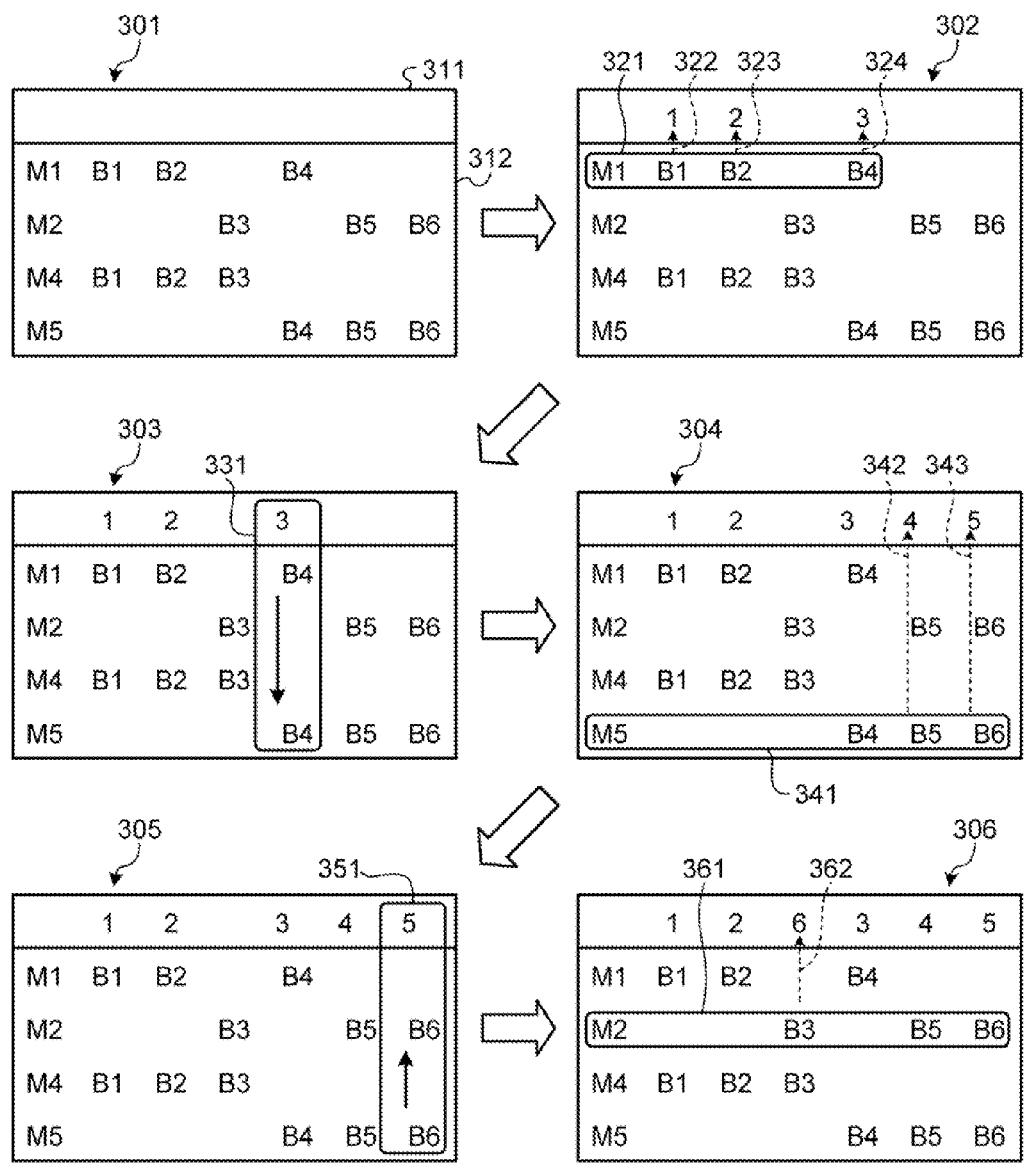
FIG. 6 is a diagram for explaining an address calculating method in an erroneous connection.

The address changing unit 14 receives, from the erroneous connection detecting unit 13, an input of information about the second stage switch 23 and the first stage switch 22 which are specified by the erroneous connection detecting unit 13 and a connection relationship thereof. Then, the address changing unit 14 creates a connection table representing the connection relationship between the second stage switch 23 and the first stage switch 22 as in a table 312 of FIG. 6 based on the information about the second stage switch 23 and the first stage switch 22 which are received and the connection relationship thereof. FIG. 6 is a diagram for explaining a method for calculating an address in the erroneous connection. Furthermore, the address changing unit 14 adds an address allocation column to a connection table such as a listing column 311, and thus creates an address calculation table 301.

Moreover, the address changing unit 14 acquires, from the initial address allocating unit 11, the node number of each node 21 and information about the first stage switch to which the node 21 is connected in a state in which the initial address allocating unit 11 allocates the node number. Then, the address changing unit 14 gives the first stage switch a number in order from one in ascending order of the node number of the node connected in a state in which the initial address allocating unit 11 allocates the node number. In the present embodiment, the address changing unit 14 gives a number of one to nine in order of the switches B1 to B9. Thereafter, the address changing unit 14 acquires, as a use number, the number given to the first stage switch 22 described in the address calculation table 301. In the present embodiment, the address changing unit 14 acquires one to six as the use number.

Next, the address changing unit 14 specifies the second stage switch 23 having the smallest number and the first stage switch 22 connected to the second stage switch 23 as is illustrated in a frame 321 of an address calculation table 302. Then, the address changing unit 14 allocates the smallest one of the use numbers to any of the specified first stage switches 22 which has the smallest number. In the present embodiment, the smallest number is a number of one. Therefore, the address changing unit 14 allocates the number of one to the switch B1 as represented in an arrow 322. Furthermore, the address changing unit 14 allocates a number from the smaller residual use numbers in ascending order of the switch number to the other first stage switches 22. In the present embodiment, the address changing unit 14 allocates numbers of two and three to the switches B2 and B4 as represented in arrows 323 and 324, respectively.

Subsequently, the address changing unit 14 confirms another line to which the first stage switch 22 having the greatest one of the allocated numbers is connected as is illustrated in a frame 331 of an address calculation table 303.

Then, the address changing unit 14 specifies another second stage switch 23 to which the first stage switch 22 having the greatest one of the allocated numbers is connected and another first stage switch 22 connected to the same switch as is illustrated in a frame 341 of an address calculation table 304. Then, the address changing unit 14 allocates the smallest one of the residual use numbers to any of the specified first stage switches 22 which has the smallest number. In the present embodiment, the smallest residual number is four. Therefore, the address changing unit 14 allocates the number of four to the switch B5 as represented in an arrow 342. Furthermore, the address changing unit 14 allocates, to the other first stage switches 22, the smaller residual use number in descending order of the number of the switch. In the present embodiment, the address changing unit 14 allocates a number of five to the switch B6 as represented in an arrow 343.

Next, the address changing unit 14 confirms the other line to which the first switch 22 having the greatest one of the allocated numbers is connected as is illustrated in a frame 351 of an address calculation table 305.

Subsequently, the address changing unit 14 specifies the other second stage switch 23 to which the first stage switch 22 having the greatest one of the allocated numbers is connected and the other first stage switch 22 connected to the same switch as is illustrated in a frame 361 of an address calculation table 306. Then, the address changing unit 14 allocates the smallest one of the residual use numbers to any of the specified first stage switches 22 which has the smallest number. In the present embodiment, the smallest residual number is six. Therefore, the address changing unit 14 allocates the number of six to the switch B3 as represented in an arrow 362. In the present embodiment, there is no first stage switch 23 to which the number is not allocated. Consequently, the address changing unit 14 ends the allocation of the number. On the other hand, in the case in which there is the first stage switch 22 to which the number has not been allocated yet, the address changing unit 14 further allocates, to the other first stage switch 22, the smaller residual use number in descending order of the number of the switch.

The address changing unit 14 repeats the processing for allocating the number until the number is completely allocated to all of the first stage switches 22 described in the connection table.

Then, the address changing unit 14 calculates a remainder obtained through a division of the number allocated to each of the first stage switches 22 by a half value of the number of the ports of the switch. Thereafter, the address changing unit 14 decides whether values calculated for the first stage switches 22 connected to the optional second stage switches 23 are different from each other or not. If all of the values are different from each other, the address changing unit 14 decides that the allocation of the number is successful. On the other hand, if some of them have equal values to each other, the address changing unit 14 decides that the allocation of the number ends in failure and ends the processing for calculating an address. In the present embodiment, the numbers of 1, 2 and 3 are given to the first stage switch 22 connected to the switch M1 as illustrated in the address calculation table 306 of FIG. 6. Remainders obtained by dividing the numbers are 1, 2 and 0 respectively, and all of the values are different from each other. Moreover, the numbers of 6, 4 and 5 are given to the first stage switch 22 connected to the switch M2. Remainders obtained by dividing the numbers are 0, 1 and 2 respectively, and all of the values are different from each other. Furthermore, the numbers of 1, 2 and 6 are given to the first stage switch 23 connected to the switch M4. Remainders obtained by dividing the numbers are 1, 2 and 0 respectively, and all of the values are different from each other. In addition, the numbers of 3, 4 and 5 are given to the first stage switch 23 connected to the switch M5. Remainders obtained by dividing the numbers are 0, 1 and 2 respectively, and all of the values are different from each other. In the present embodiment, accordingly, the address changing unit 14 decides that the allocation of the number is successful.

When deciding that the allocation of the number is successful, the address changing unit 14 multiples a value obtained by subtracting one from the allocated number by a half value of the number of ports, thereby calculating the smallest node number of the node 21 connected to the first stage switch 22 to which the number is allocated. Then, the address changing unit 14 gives a serial number from the calculated value to obtain the node numbers of all of the nodes 21 connected to the first stage switch 22. Thus, the address changing unit 14 determines the node 21 of which node number is to be changed, and the node number. In the present embodiment, the number of 1 is allocated to the switch B1. Therefore, the smallest node number of the node 21 connected to the switch B1 is (1−1)×3=0. The node number of the node 21 connected to the switch B1 is 0, 1 and 2. Moreover, the number of 2 is allocated to the switch B2. Therefore, the node number of the node 21 connected to the switch B2 is 3, 4 and 5. Moreover, the number of 6 is allocated to the switch B3. Therefore, the node number of the node 21 connected to the switch B3 is 15, 16 and 17. Furthermore, the number of 3 is allocated to the switch B4. Therefore, the node number of the node 21 connected to the switch B4 is 6, 7 and 8. In addition, the number of 4 is allocated to the switch B5. Therefore, the node number of the node 21 connected to the switch B5 is 9, 10 and 11. Moreover, the number of 5 is allocated to the switch B6. Therefore, the node number of the node 21 connected to the switch B6 is 12, 13 and 14.

The address changing unit 14 allocates a new node number obtained for the node 21 determined to be changed in the node numbers allocated by the initial address allocating unit 11 and determines the allocation of the new node number for the node 21.

Although it is decided whether or not the node number can be allocated by using the number allocated to the first stage switch 22 in the present embodiment, another method may be employed. For example, a new node number of each node is also calculated and a communication based on a shift communication pattern using the calculated node number is then subjected to a simulation to confirm that a path competition is not caused. Thus, it is also possible to decide whether the allocation of the node number is enabled or not.

Figure 7:
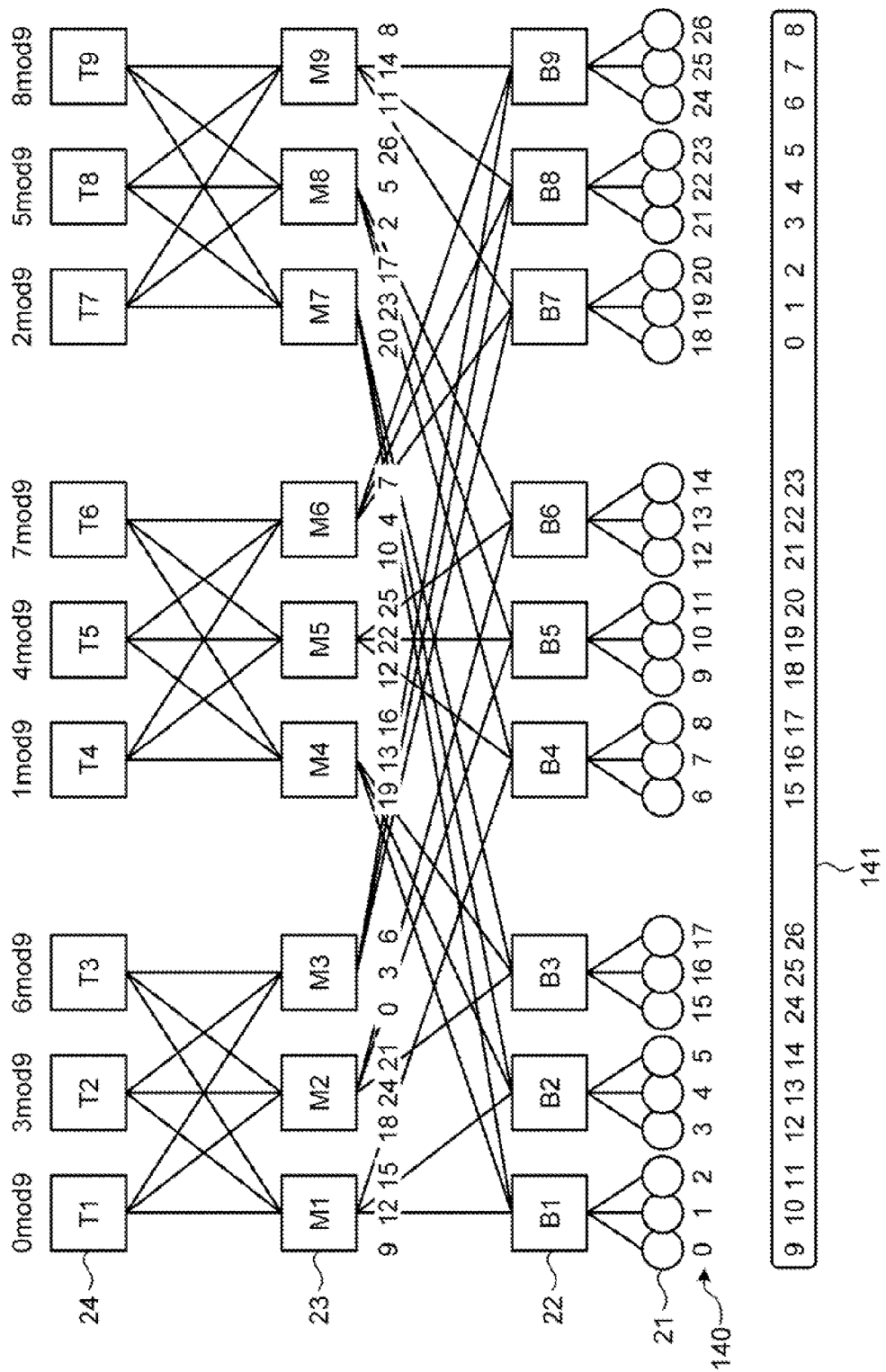
FIG. 7 is a diagram for explaining an address subjected to a change and a signal transmission.

The address changing unit 14 allocates the node to the node 21 to change the address of the node 21 by using the allocation of the new node number which is determined. As a result, in the network system 2 according to the present embodiment, a number of 140 illustrated in FIG. 7 is allocated as a node number to the node 21. FIG. 7 is a diagram for explaining the changed address and signal transmission.

Next, the signal transmission after the change of the address according to the present embodiment will be described with reference to FIG. 7. The description will be given by taking, as an example, a signal transmission state in a ninth communication phase in the case in which the shift communication pattern is used. A numeral surrounded by a frame 141 indicates a node number of a transmitting destination for a signal sent from each node 21 in the ninth communication phase.

The switches B1 to B9 transmit signals received from the nodes 21 connected to themselves to the corresponding second stage switches 23 according to remainders obtained through a division of the node numbers by 3. As is apparent from the values represented in the frame 141, three signals output from the respective nodes 21 are represented as 0 mod 3, 1 mod 3 and 2 mod 3. Accordingly, all signals are transmitted via different paths from the switches B1 to B9 to the switches M1 to M9. For this reason, the path competition is not caused.

The switches M1 to M9 receive signals setting, as transmitting destinations, the node numbers described thereunder. The node numbers of the transmitting destinations for the signals received by the respective switches M1 to M3 are 0 mod 9, 1 mod 9 and 2 mod 9. Moreover, the node numbers of the transmitting destinations for the signals received by the respective switches M4 to M6 are 3 mod 9, 4 mod 9 and 5 mod 9. Furthermore, the node numbers of the transmitting destinations for the signals received by the respective switches M7 to M9 are 6 mod 9, 7 mod 9 and 8 mod 9. Accordingly, all of the signals are also transmitted from the switches M1 to M9 to the switches T1 to T9 via the different paths. Therefore, the path competition is not caused. Also in the case in which the all-to-all communication using the shift communication pattern is carried out in the state in which the erroneous connection is caused due to the change of the address, therefore, it is possible to ensure a wide band in the signal transmission.

Figure 8:
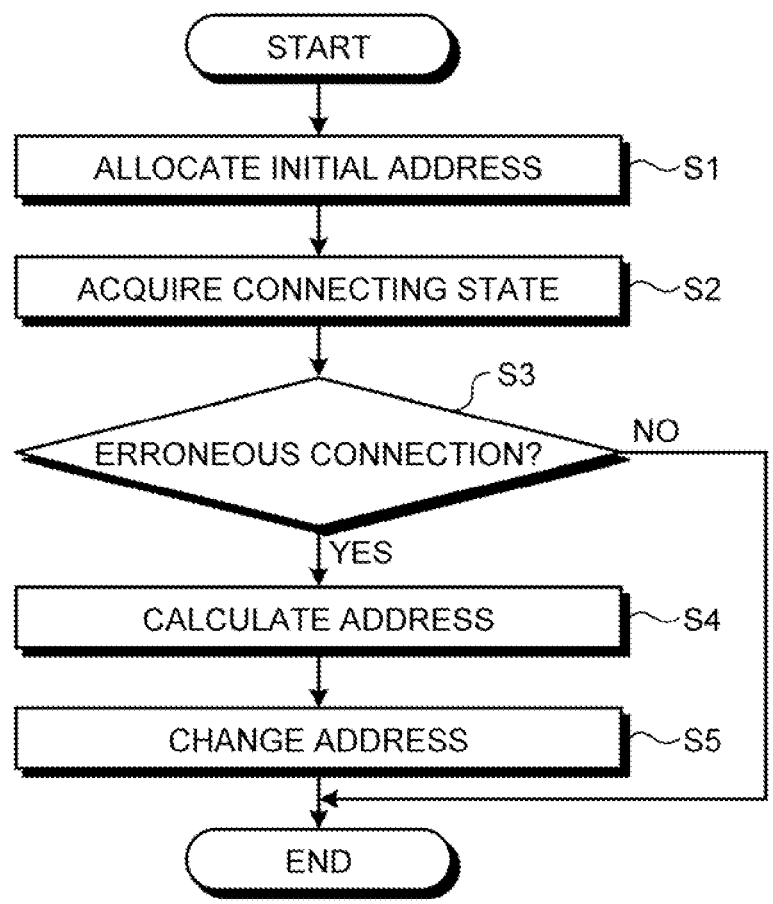
FIG. 8 is a flow chart illustrating a processing for changing an address in an erroneous connection.

Next, a flow of the processing for changing an address in an erroneous connection through the network managing device according to the present embodiment will be described with reference to FIG. 8. FIG. 8 is a flow chart illustrating the processing for changing an address in the erroneous connection.

The initial address allocating unit 11 allocates an initial address having a serial number to each node 21 (Step S1).

The connecting state acquiring unit 12 acquires connection information from the first stage switch 22, the second stage switch 23 and the third stage switch 24. Then, the connecting state acquiring unit 12 collects the acquired connection information to create a connection information table (Step S2). The details of a flow of a processing for creating the connection information table will be described later.

The erroneous connection detecting unit 13 acquires the connection information table from the connecting state acquiring unit 12 and compares a current connecting state with a prestored normal connecting state. Then, the erroneous connection detecting unit 13 decides whether the erroneous connection is caused in the current connecting state or not (Step S3).

If it is decided by the erroneous connection detecting unit 13 that the erroneous connection is not caused (Step S3: NO), the network managing device 1 ends the change of the address.

On the other hand, if it is decided by the erroneous connection detecting unit 13 that the erroneous connection is caused (Step S3: YES), the address changing unit 14 uses the current connecting state described in the connecting state table to calculate a new address of each node 21 in the state of the erroneous connection (Step S4). The detailed flow of the processing for calculating an address will be described later.

Thereafter, the address changing unit 14 allocates the new address thus calculated to each node 21, thereby changing the address of the node 21 (Step S5).

Figure 9:
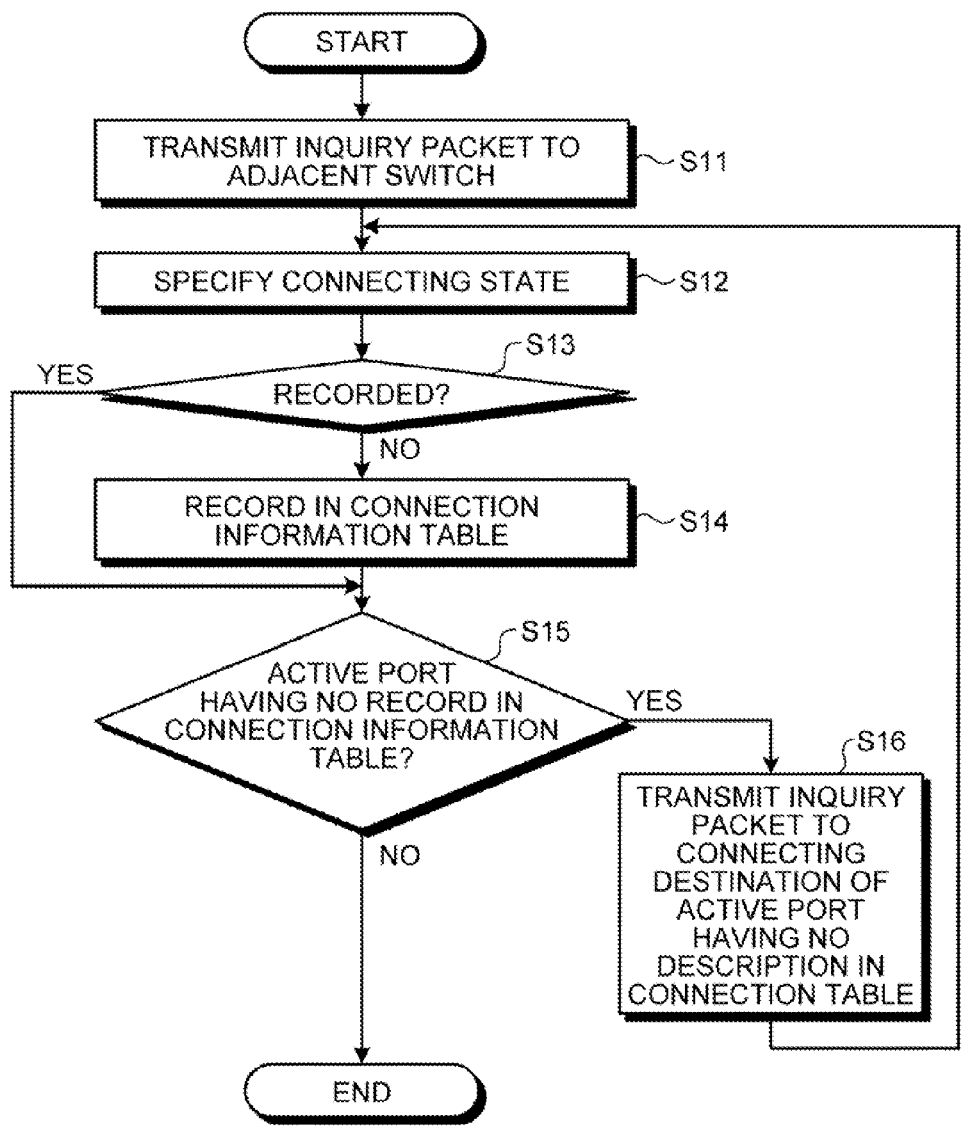
FIG. 9 is a flow chart illustrating a processing for acquiring a connecting state.

Next, a flow for acquiring the connecting state will be described with reference to FIG. 9. FIG. 9 is a flow chart illustrating a processing for acquiring the connecting state. The flow described in FIG. 9 corresponds to the details of the processing in the Step S2 of FIG. 8.

The connecting state acquiring unit 12 transmits an inquiry packet for making an inquiry about the connecting state to an adjacent switch (Step S11).

The connecting state acquiring unit 12 specifies a connecting state of a switch or a node to which the inquiry packet is transmitted in response to the inquiry packet (Step S12). For example, the connecting state acquiring unit 12 acquires, from the switch, identification information about the switch, information about a port receiving the inquiry packet and information about an active port. Moreover, the connecting state acquiring unit 12 acquires identification information about a node from the node.

Then, the connecting state acquiring unit 12 decides whether the specified connecting state has already been described in the connection information table or not (Step S13). If the specified connecting state is not recorded (Step S13: NO), the connecting state acquiring unit 12 records the specified connecting state in the connection information table (Step S14).

On the other hand, if the specified connecting state has been recorded (Step S13: YES), the connecting state acquiring unit 12 proceeds to Step S15.

Then, the connecting state acquiring unit 12 decides whether an active port having no record of a connecting destination is present in the connection information table or not (Step S15). If the active port having no record is present (Step S15: YES), the connecting state acquiring unit 12 transmits the inquiry packet to the connecting destination of the active port (Step S16) and the processing returns to the Step S12.

On the other hand, if the active port having no record is not present (Step S15: NO), the connecting state acquiring unit 12 ends the creation of the connection information table.

Figure 10:
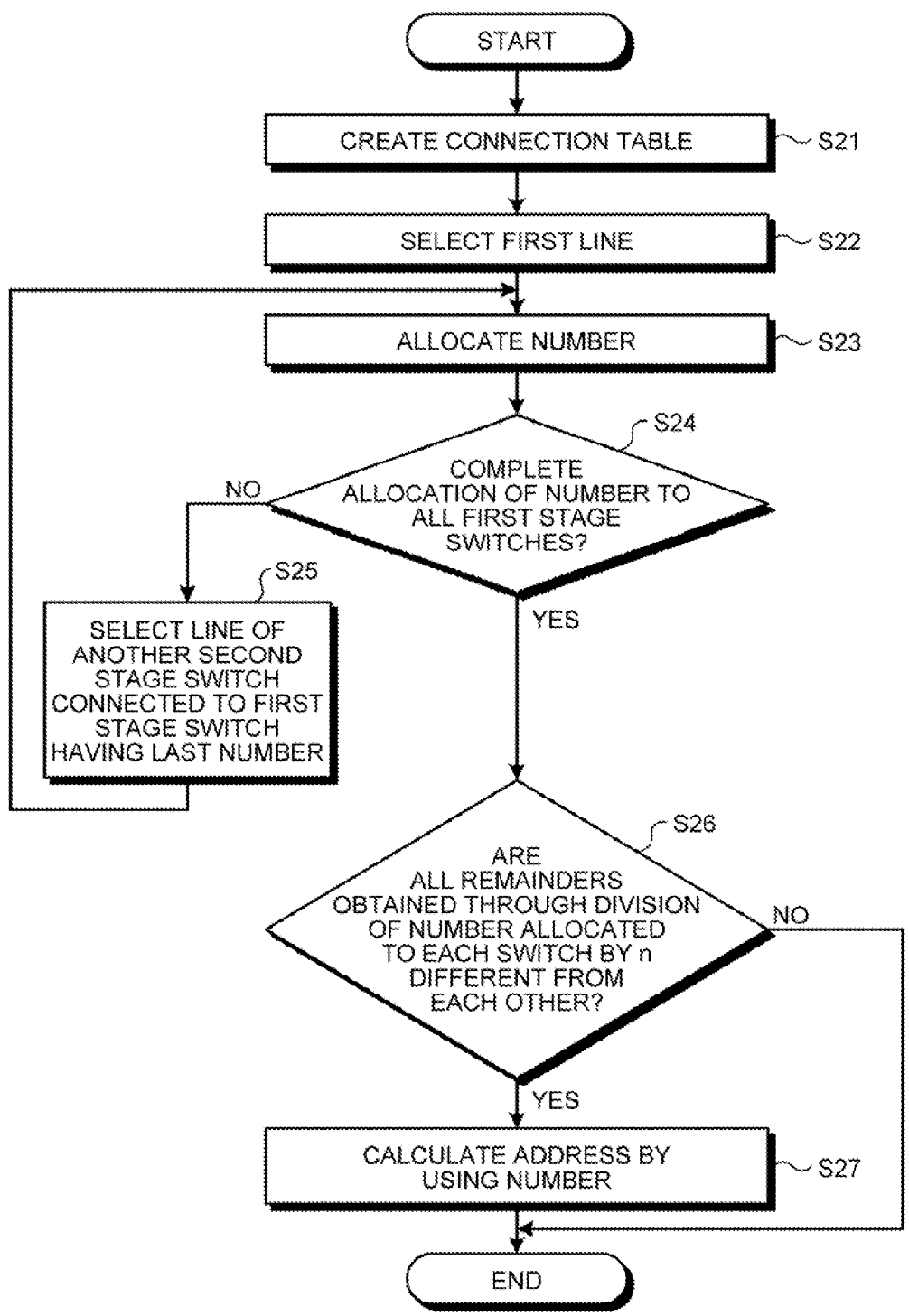
FIG. 10 is a flow chart illustrating a processing for calculating an address.

Next, a flow of an address calculation processing through the network managing device according to the present embodiment will be described with reference to FIG. 10. FIG. 10 is a flow chart illustrating the address calculation processing. The flow described in FIG. 10 corresponds to the details of the processing in the Step S4 of FIG. 8.

The address changing unit 14 receives, from the erroneous connection detecting unit 13, information about the second stage switch 23 in which the erroneous connection is caused, the first stage switch 22 connected to the second stage switch 23 and another second stage switch 23 connected to the first stage switch 22 together with the connecting state. Then, the address changing unit 14 creates a connection table by using the information received from the erroneous connection detecting unit 13 (Step S21). Furthermore, the address changing unit 14 gives a serial number from one to the first stage switch 22 in such order that the node 21 having a smaller node number allocated by the initial address allocating unit 11 is connected. Thereafter, the address changing unit 14 acquires, as a use number, a number allocated to the first stage switch 22 described in the connection table in the numbers given to the first stage switches 22.

Next, the address changing unit 14 selects a line representing the connection of the second stage switch 23 having the smallest number, that is, a first line of the connection table (Step S22).

Subsequently, the address changing unit 14 allocates a smaller use number in descending order of the switch number of the first stage switch 22 described in the selected line (Step S23).

The address changing unit 14 decides whether the number is completely allocated to all of the first stage switches 22 or not (Step S24). If the allocation is not completed (Step S24: NO), the address changing unit 14 selects a line of another second stage switch 23 connected to the first stage switch having a last allocated number (Step S25) and the processing returns to the Step S23.

On the other hand, if the allocation is completed (Step S24: YES), the address changing unit 14 divides the number allocated to each first stage switch 22 by a half n of the number of the ports of the switch, thereby obtaining a remainder. Then, the address changing unit 14 decides whether or not all of the remainders in the first stage switches 22 connected to the respective second stage switches 23 are different from each other (Step S26). If some of the remainders obtained through the division by n are equal to each other (Step S26: NO), the address changing unit 14 ends the address calculation processing.

On the other hand, if all of the remainders obtained through the division by n are different from each other (Step S26: YES), the address changing unit 14 multiples a value obtained by subtracting one from the number allocated to the first stage switch 22 by a half n of the number of the ports of the switch, thereby calculating a new address of the node 21 (Step S27).

As described above, the network managing device according to the present embodiment automatically changes the node number to suppress the occurrence of the path competition if the erroneous connection is caused for the normal Fat Tree configuration. Also in the case in which the erroneous connection is caused in the network, consequently, it is possible to ensure a wide band in a signal transmission. Thus, it is possible to relieve a deterioration in a performance of the network.

Although the description has been given to the network managing device 1 as the device disposed on the outside of the network system 2 in the present embodiment, the present invention is not restricted thereto. For example, the network managing device may be incorporated in the node or any of the first to third switches. Moreover, a program for controlling an operation of the network managing device may be operated as a part of a function of an application which is referred to as "SubnetManager" for managing a network.

According to the mode of the network managing device and the network managing method which are disclosed in the present invention, it is possible to produce an effect that a deterioration in a performance of a network in an occurrence of an erroneous connection can be relieved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A network managing device for managing a network in which a plurality of first stage switches having a plurality of nodes connected thereto respectively, a plurality of second stage switches to be upper switches of the first stage switches and a plurality of third stage switches to be upper switches of the second stage switches are connected in a configuration of Fat Tree, the network managing device comprising:

a processor and a memory, wherein the processor includes an initial address allocating unit that allocates a node numbers respectively to each of the nodes connected to the respective first stage switches in such a manner that the nodes have serial numbers and each of the nodes connected to each of the first stage switches has a serial numbers;

a transmit unit that transmits a signal received from the connected nodes to the second stage switches based on a remainder obtained through a division of the node numbers of a transmitting destination for the signal received from the connected nodes by a half value of a number of a plurality of ports of the first stage switch;

a connecting state acquiring unit that acquires each of connecting states from the first stage switches, the second stage switches and the third stage switches, the connecting state being a topology which indicates a network connection between the first stage switches and the second stage switches or the second stage switches and the third stage switches;

an erroneous connection detecting unit that compares the connecting state acquired by the connecting state acquiring unit with a prestored connecting state, thereby detecting an erroneous connection; and an address changing unit that specifies, as an erroneous connection switch, a second stage switch from which an erroneous connection is detected, specifies, as a related switch, another second stage switch connected to a first stage switch to which the erroneous connection switch is connected, allocates a provisional numbers to each of the first stage switches in order from one in ascending order of the node numbers of the connected nodes, acquires the provisional numbers of the first stage switches to which the erroneous connection switch and the related switch are connected, specifies firstly the second stage switches which are connected to the first stage switch to which the node having a minimum node number is connected in the first stage switches to which the erroneous connection switch and the related switch are connected, allocates the acquired provisional numbers to the first stage switches which are connected to the second stage switches specified firstly in order from one in ascending order of the provisional numbers of the connected nodes, specifies secondly the second stage switches which are connected to the first stage switch to which the node having a maximum node number is connected in the first stage switches to which the acquired provisional numbers are allocated, specifies the first stage switches connected to the second stage switches specified secondly without being connected to the second stage switches specified firstly, selects the specified first stage switches in ascending order of the provisional number of the connected nodes, allocates the provisional numbers, which have not been allocated, in ascending order to the specified first stage switches that have been selected, selects the other first stage switches in ascending order of the provisional number of the connected nodes, allocates the provisional numbers, which have not been allocated, in ascending order to the other first stage switches that have been selected, and changes the node number which is allocated by the initial address allocating unit to satisfy a first condition based on the connecting state, when the erroneous connection is detected by the erroneous connection detecting unit and all of the remainders obtained through the division of the provisional numbers allocated to the first stage switches connected to each of the second stage switches by the half value of the number of the ports of the first stage switch are different from each other for each of the second stage switches, the first condition being satisfied when remainders obtained through the division of the node numbers of the nodes which are destination of transmission of a plurality of signals which are received by the first stage switches from the connected nodes by the half value of the number of the ports are different from each other.

2. The network managing device according to claim 1, wherein the address changing unit calculates a first value through a subtraction of one from the provisional number allocated to each of the first stage switches, calculates a result number through a multiplication of a value by the half value of the number of the ports, and gives a serial number to a node connected to each of the first stage switches by setting the result number as the smallest address of the nodes connected to each of the first stage switches, thereby changing the address of the node.

3. A network managing method for managing a network in which a first stage switch having a plurality of nodes connected thereto, a second stage switch to be an upper switch of the first stage switch and a third stage switch to be an upper switch of the second stage switch are connected in a configuration of Fat Tree, the network managing method comprising:

allocating node number respectively to each of the nodes connected to the respective first stage switches in such a manner that the nodes have serial numbers and each of the nodes connected to each of the first stage switches has a serial numbers;

transmitting a signal received from the connected nodes to the second stage switches based on a remainder obtained through a division of the node numbers of a transmitting destination for the signal received from the connected nodes by a half value of a number of a plurality of ports of the first stage switch;

acquiring each of connecting states from the first stage switches, the second stage switches and the third stage switches, the connecting state being a topology which indicates a network connection between the first stage switches and the second stage switches or the second stage switches and the third stage switches;

comparing the acquired connecting state with a prestored connecting state, thereby detecting an erroneous connection;

specifying, as an erroneous connection switch, a second stage switch from which an erroneous connection is detected, specifying, as an erroneous connection switch, a second stage switch from which an erroneous connection is detected, allocating a provisional numbers to each of the first stage switches in order from one in ascending order of the node numbers of the connected nodes, acquiring the provisional numbers of the first stage switches to which the erroneous connection switch and the related switch are connected, first specifying the second stage switches which are connected to the first stage switch to which the node having a minimum node number is connected in the first stage switches to which the erroneous connection switch and the related switch are connected, allocating the acquired provisional numbers to the first stage switches which are connected to the first specified second stage switches in order from one in ascending order of the provisional numbers of the connected nodes, second specifying the second stage switches which are connected to the first stage switch to which the node having a maximum node number is connected in the first stage switches to which the acquired provisional numbers are allocated, specifying the first stage switches connected to the second specified second stage switches without being connected to the second stage switches specified firstly, selecting the specified first stage switches in ascending order of the provisional number of the connected nodes, allocating the provisional numbers, which have not been allocated, in ascending order to the specified first stage switches that have been selected, selecting the other first stage switches in ascending order of the provisional number of the connected nodes, allocating the provisional numbers, which have not been allocated, in ascending order to the other first stage switches that have been selected, and changing the address of the node which is allocated to satisfy a predetermined condition based on the connecting state when the erroneous connection is detected and all of the remainders obtained through the division of the provisional numbers allocated to the first stage switches connected to each of the second stage switches by the half value of the number of the ports of the first stage switch are different from each other for each of the second stage switches, the first condition being satisfied when remainders obtained through the division of the node numbers of the nodes which are destination of transmission of a plurality of signals which are received by the first stage switches from the connected nodes by the half value of the number of the ports are different from each other.

* * * * *